T. H. LESTER.
LABELING MACHINE.
APPLICATION FILED OCT. 30, 1917.

1,364,942.

Patented Jan. 11, 1921.

Witness:
C C Burnap

Inventor:
Thomas H. Lester
By Sheridan, Sheridan & Smith, Att'ys

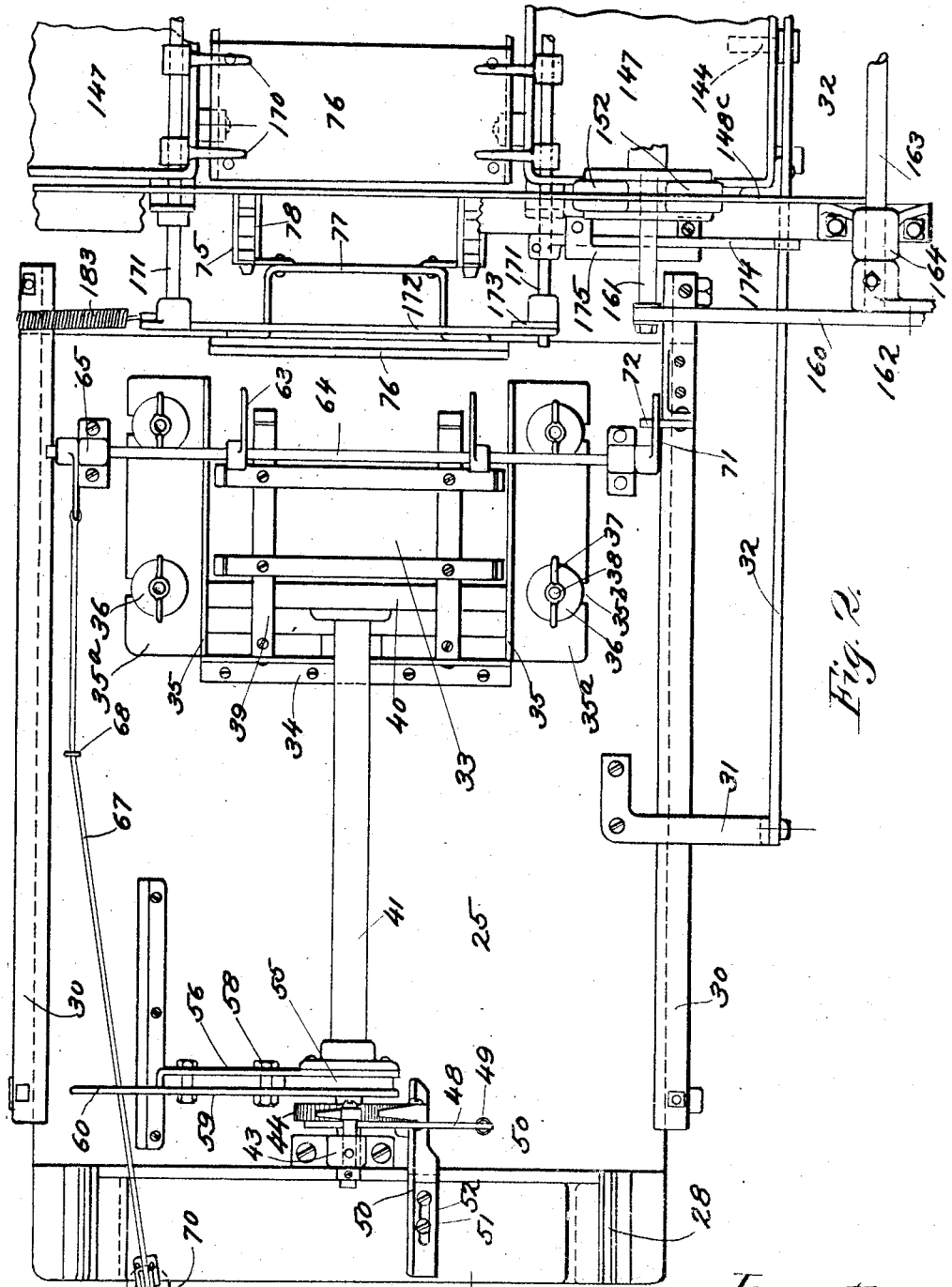

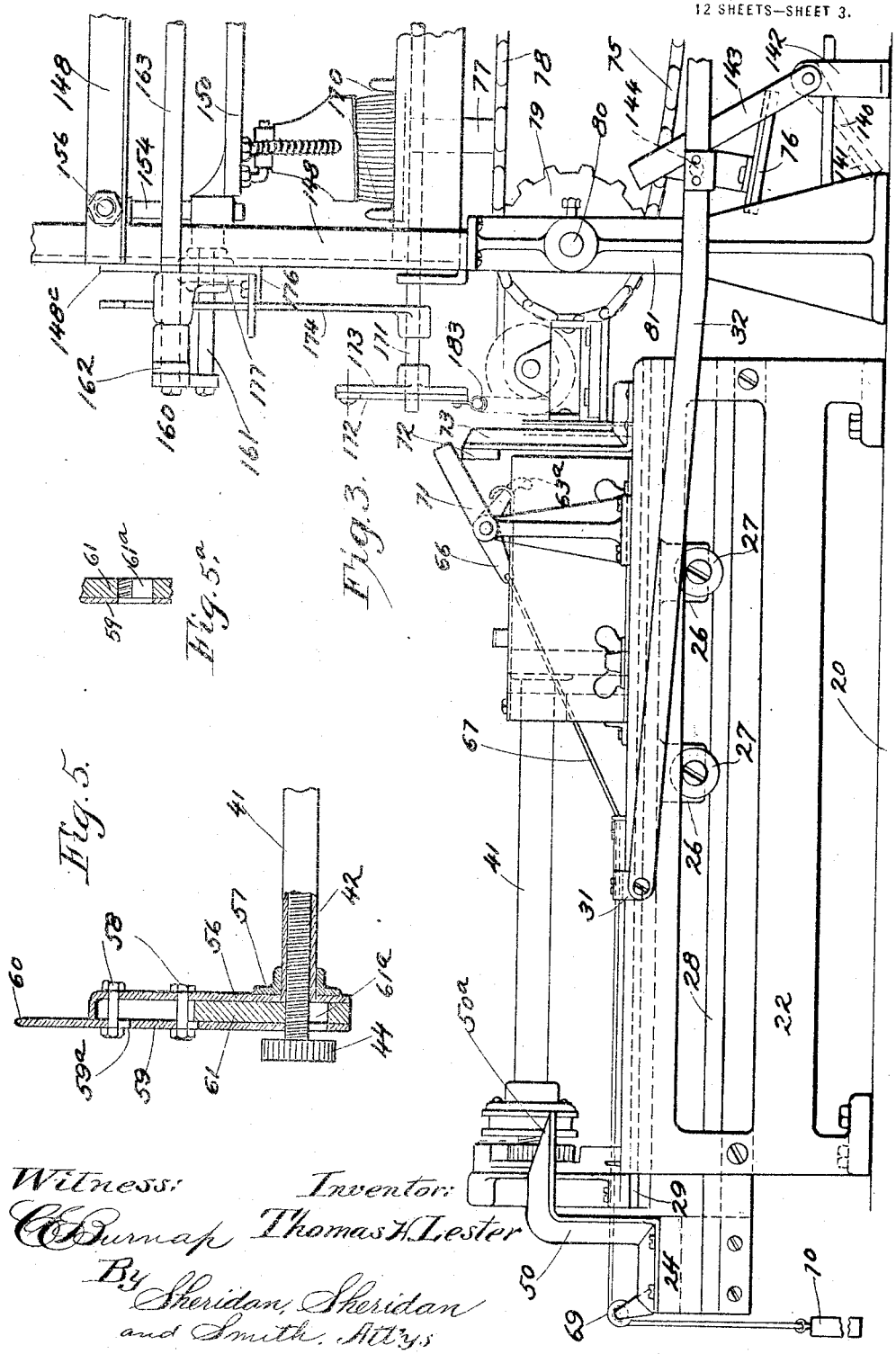

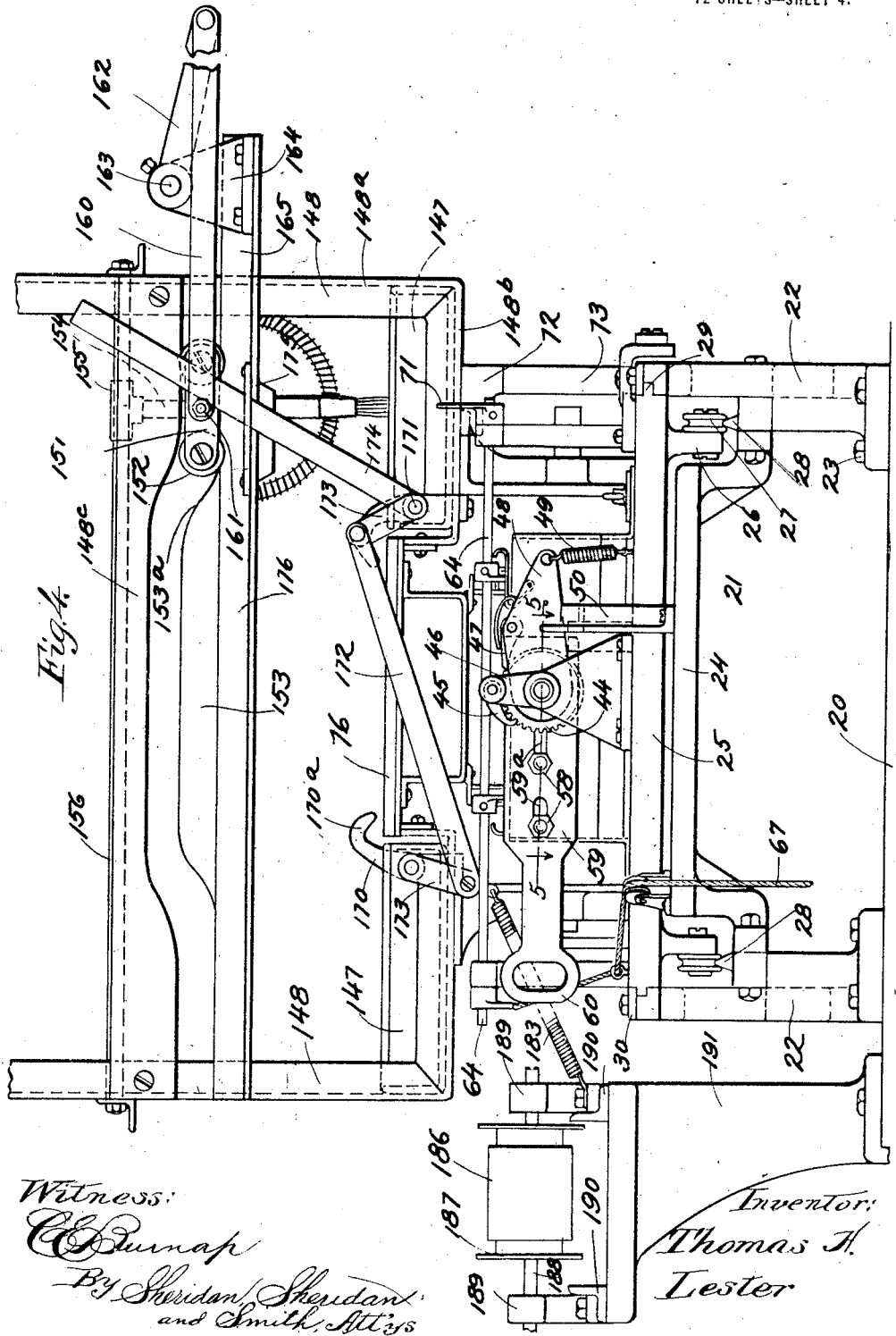

T. H. LESTER.
LABELING MACHINE.
APPLICATION FILED OCT. 30, 1917.

1,364,942.

Patented Jan. 11, 1921.
12 SHEETS—SHEET 5.

Witness:
C. E. Burnap

Inventor:
Thomas H. Lester
By Sheridan, Sheridan & Smith, Attys

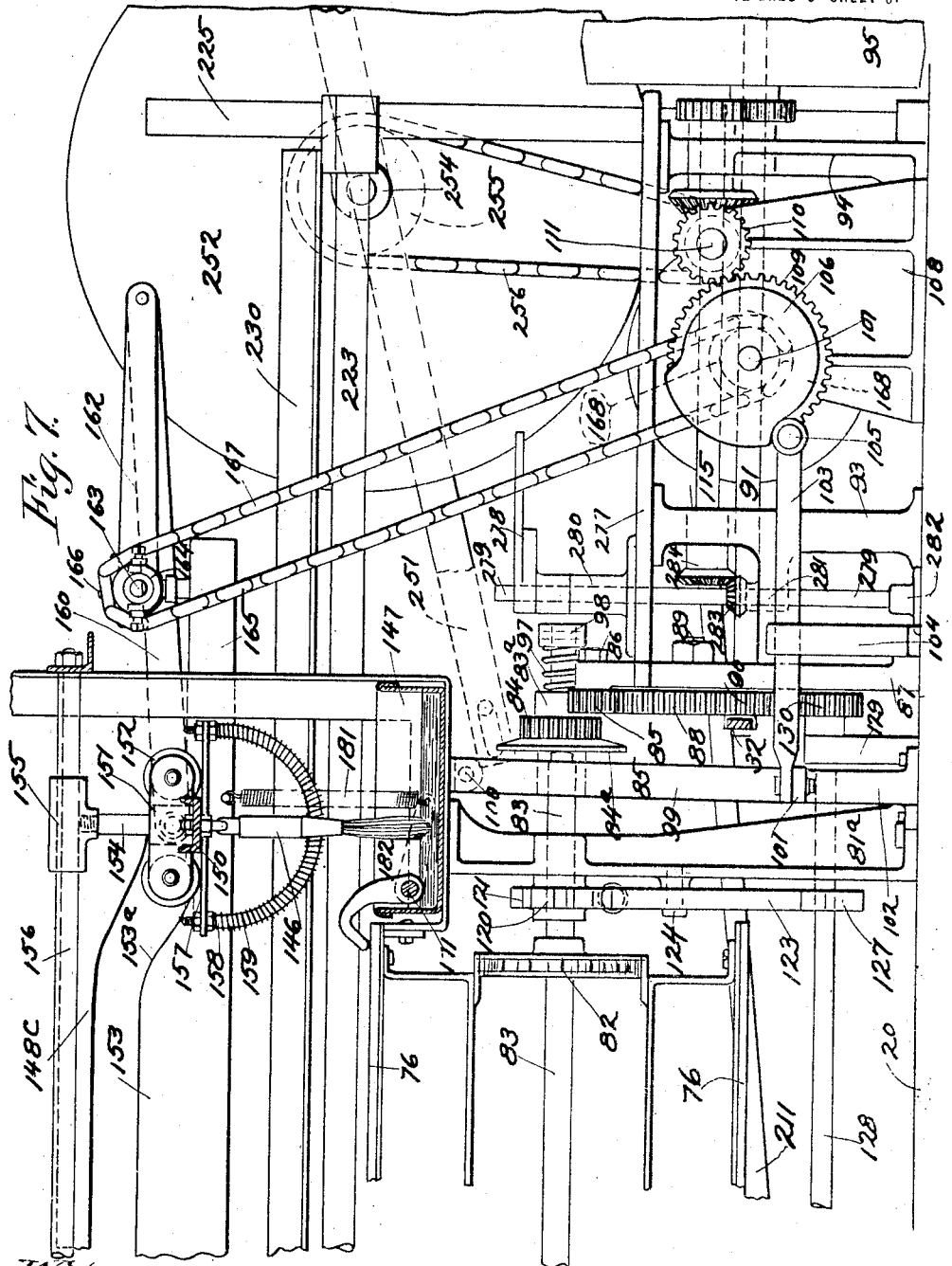

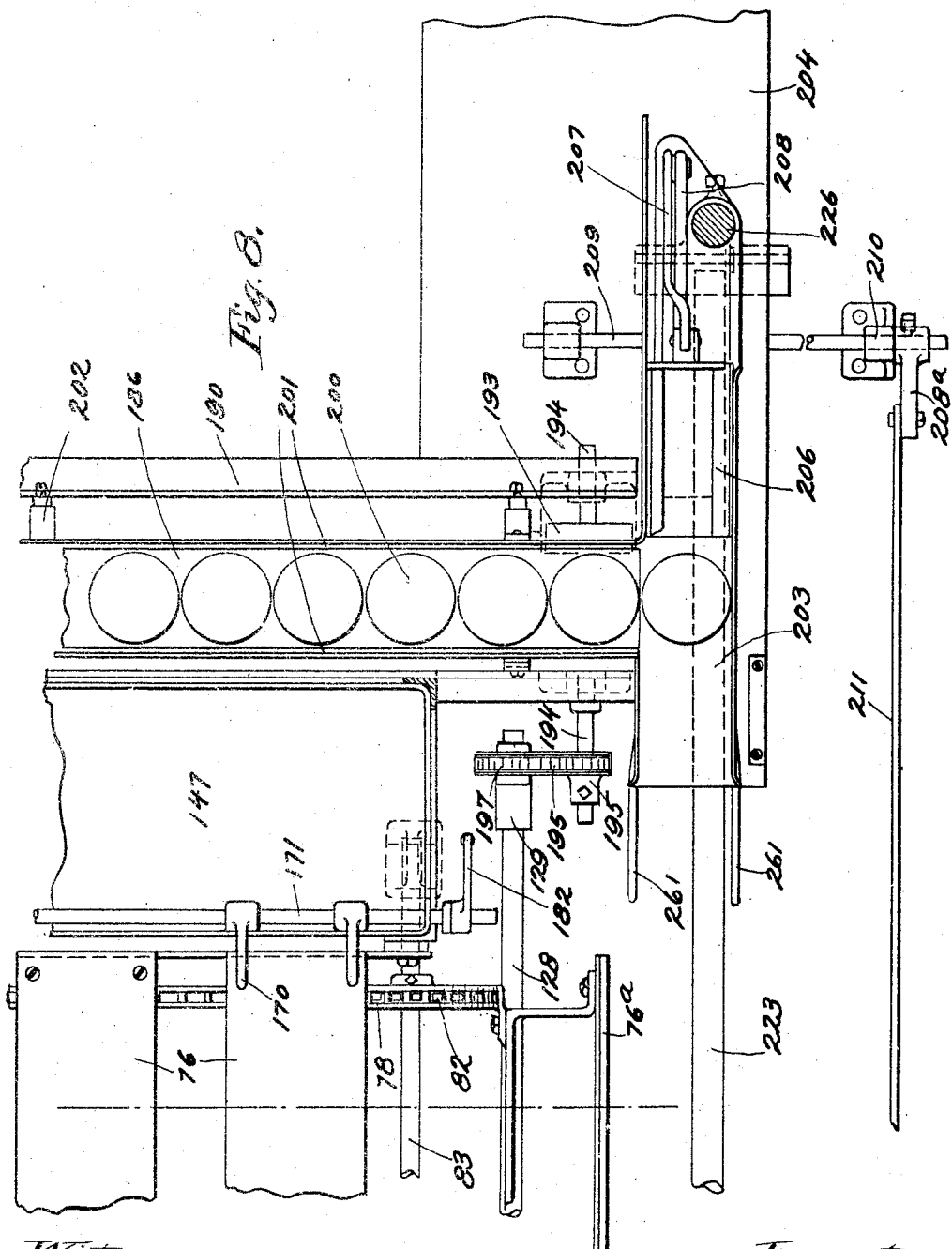

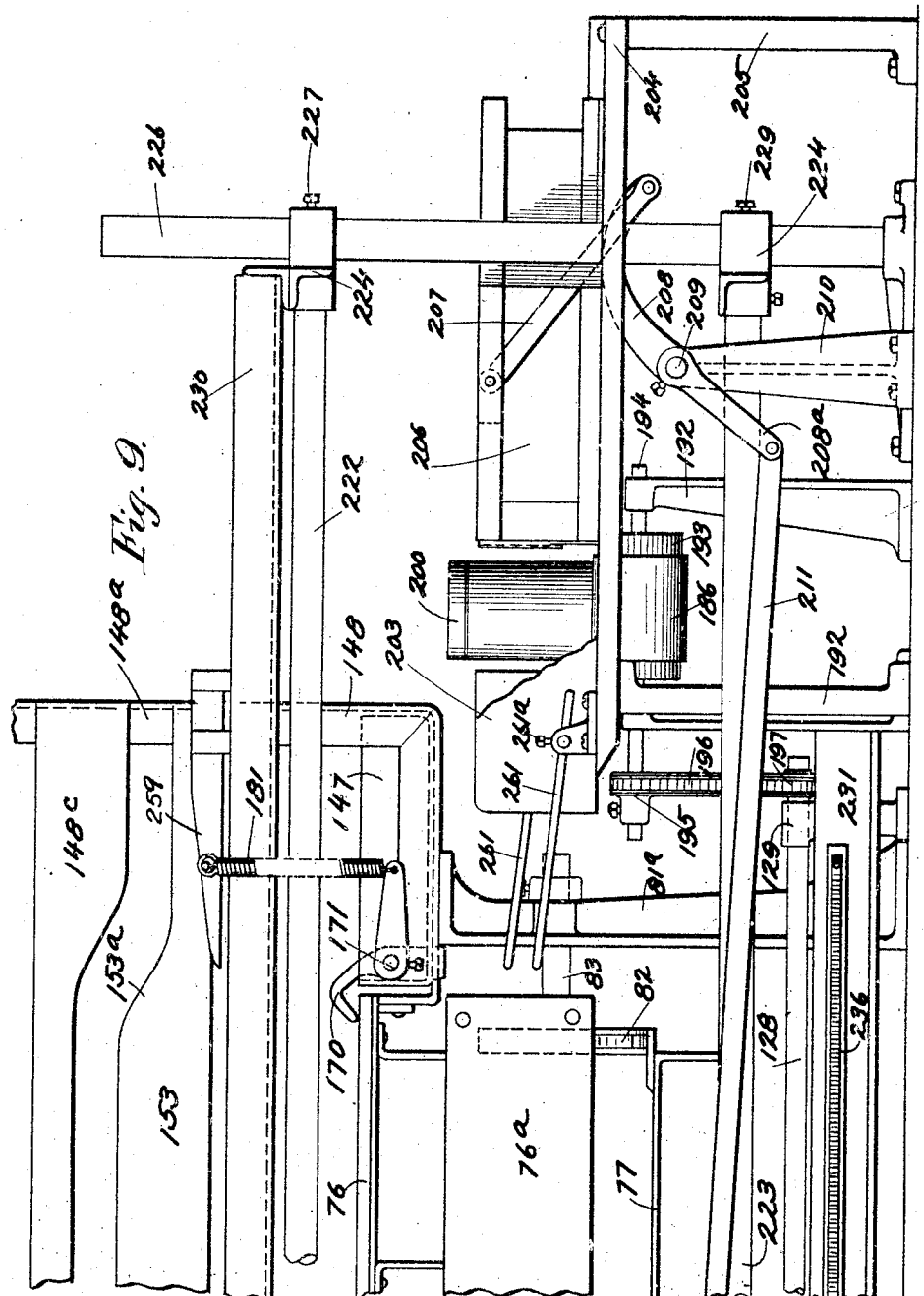

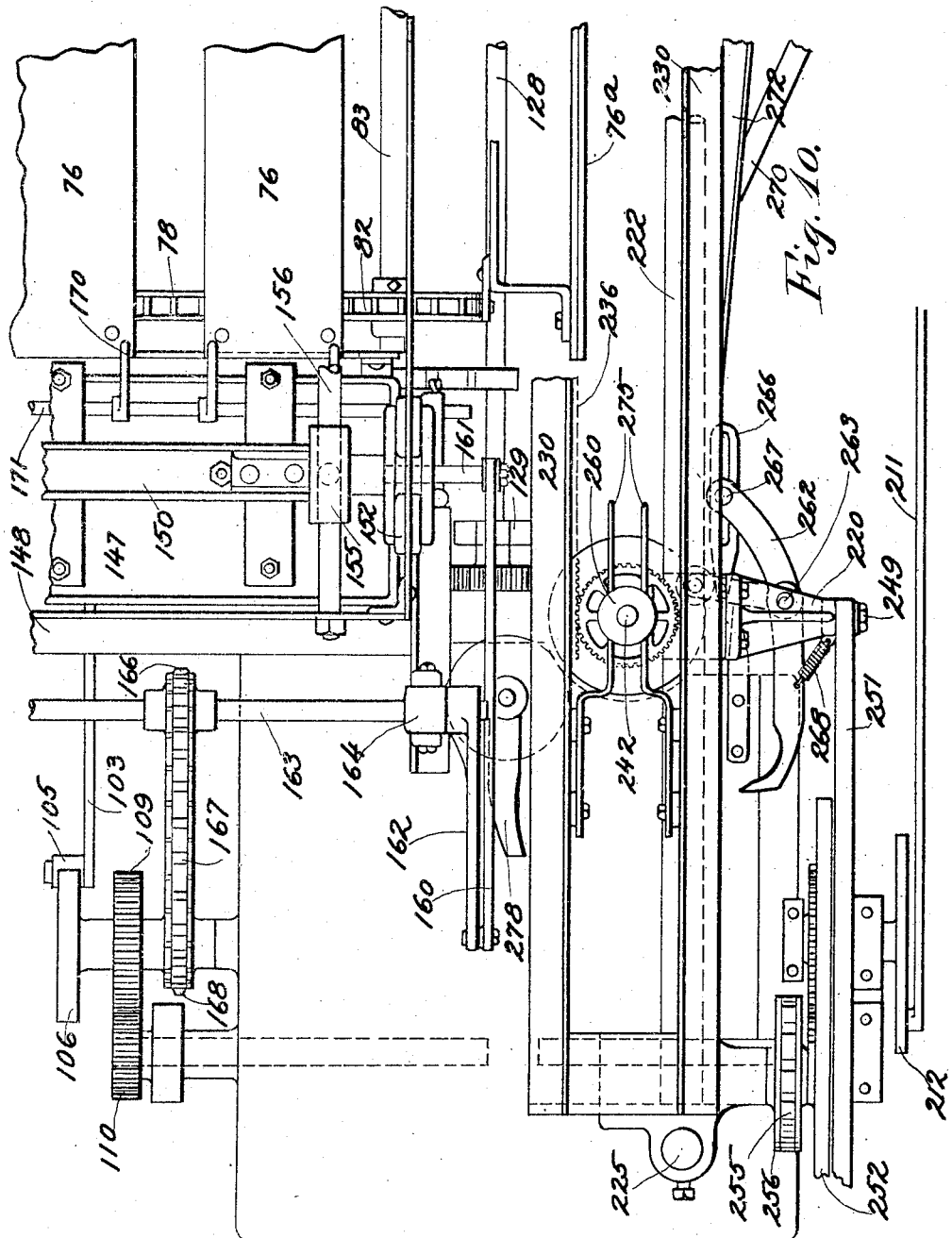

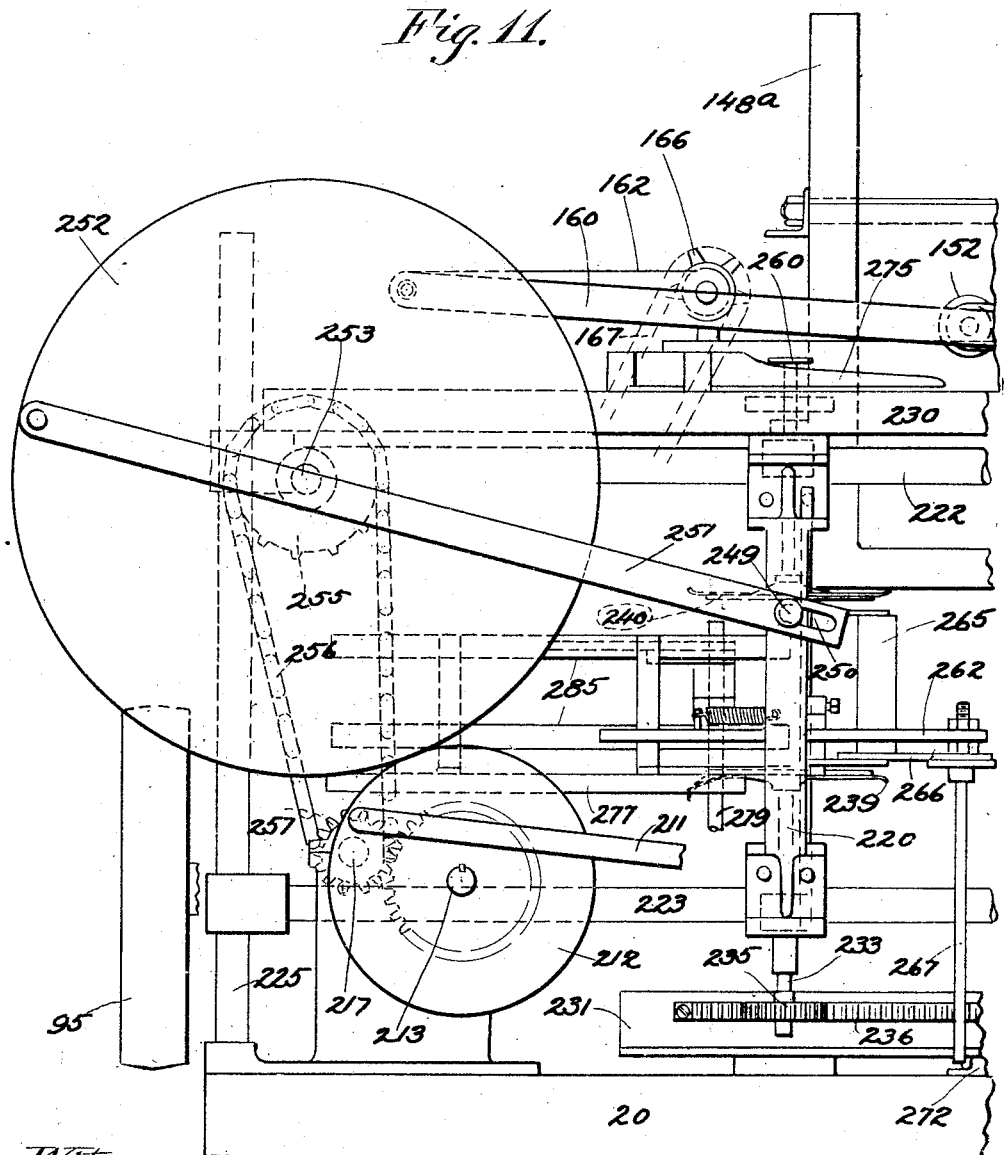

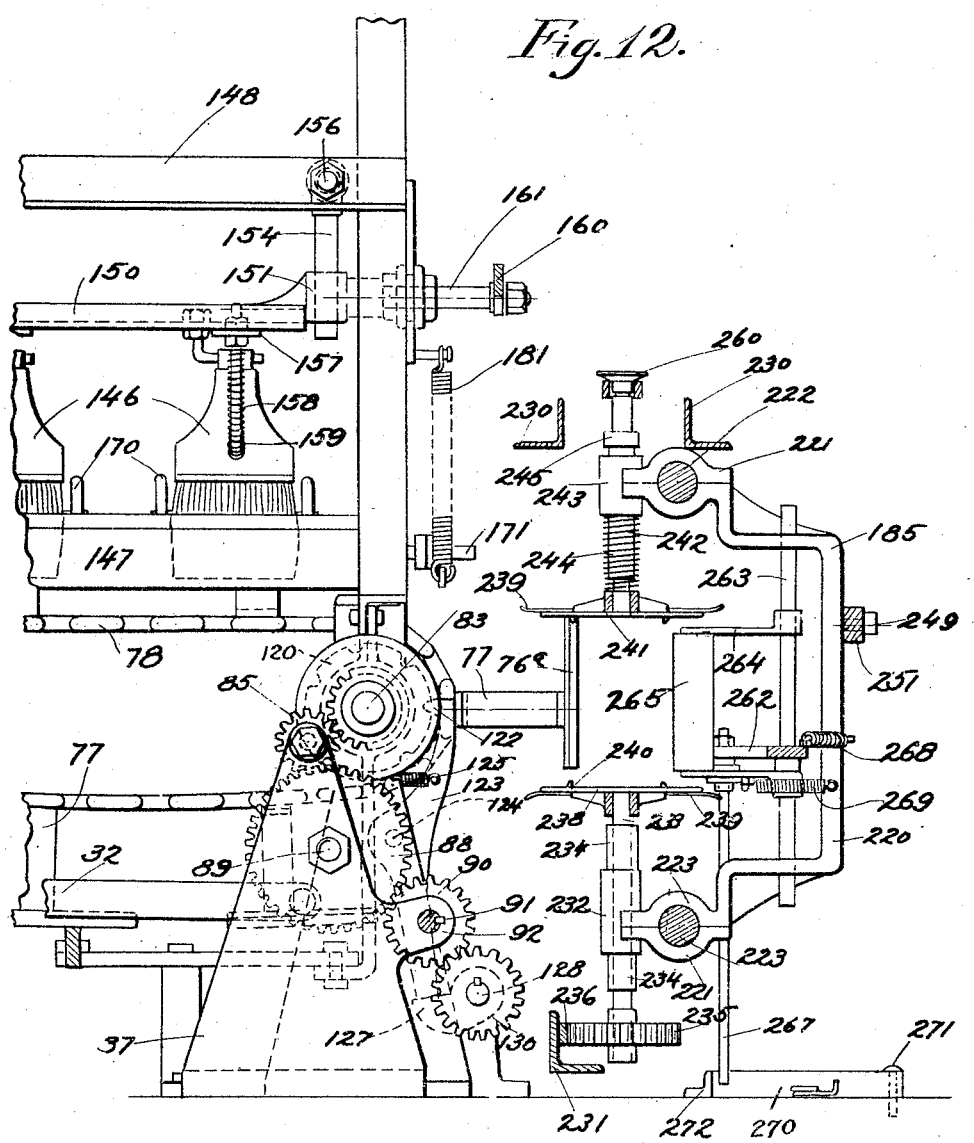

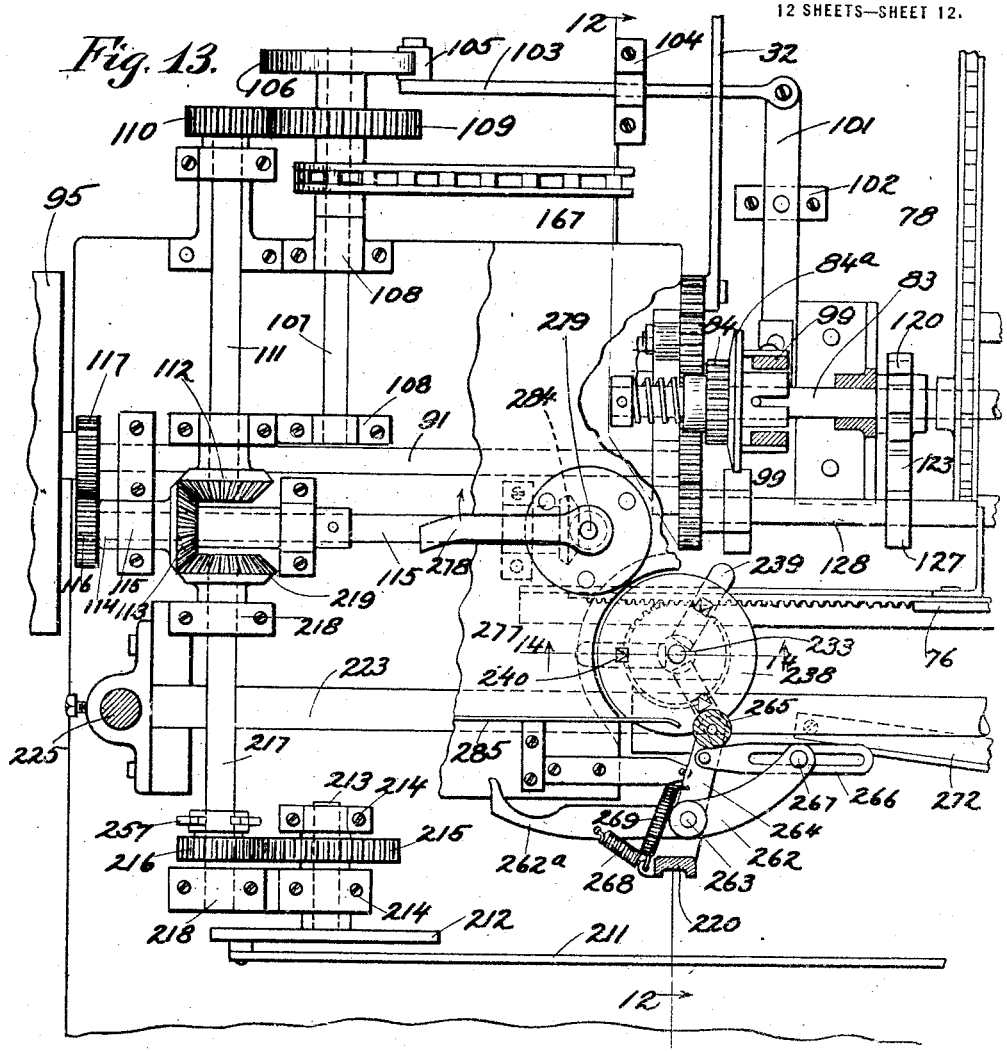
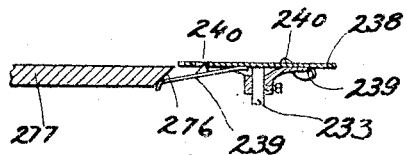

UNITED STATES PATENT OFFICE.

THOMAS H. LESTER, OF CHICAGO, ILLINOIS.

LABELING-MACHINE.

1,364,942. Specification of Letters Patent. Patented Jan. 11, 1921.

Application filed October 30, 1917. Serial No. 199,246.

*To all whom it may concern:*

Be it known that I, THOMAS H. LESTER, a citizen of the United States, residing at Chicago, in the county of Cook and State of Illinois, have invented certain new and useful Improvements in Labeling-Machines, of which the following is a specification.

This invention relates to apparatus for applying labels to cans, jars, and the like, and may be used with particular advantage for applying labels to cans when they are supported in their normal positions.

Although the invention may be used for labeling empty vessels or receptacles containing various commodities, it is of particular value in applying labels to cans which are not tightly sealed and which contain materials which would be damaged if moisture from the applied labels be allowed to enter the can. When applying labels to vessels, such as baking powder cans, in which a removable cover fits over the upper end of the can, it is important to apply the labels while the cans are supported in upright positions, so that moisture from the pasted labels cannot enter through the annular space between the can and the cover and intermingle with the baking powder in the can. The principal purpose of the present invention therefore is to provide improved apparatus for mechanically pasting and applying labels to cans while they are supported in upright positions.

Another important advantage is to provide improved apparatus for successively pasting and presenting in operative position a series of labels in combination with means for effecting a relative movement of each label with respect to a can or other vessel in contact therewith, in order to apply the label to the can. Another feature is the provision of means for holding the labels in operative positions, and means for moving a series of cans into position to engage the labels successively. A further feature is the provision of novel means for automatically saturating the labels with paste before they are brought into contact with the cans. Still another object is to provide improved means for feeding and carrying the labels, and to provide improved means for feeding and carrying the cans across the path of travel of the labels. Still another object is to provide an improved can carrier comprising novel means for engaging the cans and for automatically discharging them therefrom after they have been labeled. A further feature is the provision of an improved label carrier with improved means for automatically feeding the labels to the carrier. Other objects relate to various features of construction, and to the combination thereof in a machine, as will appear more fully hereinafter.

The nature of the invention will be understood from the following specification, taken in connection with the accompanying drawings, in which one embodiment of the invention is illustrated.

In the drawings—

Fig. 2 is an enlarged top plan view of that portion of the machine illustrated at the left of Fig. 1, showing the means for holding the labels and feeding them to the label carrier;

Fig. 3 shows an enlarged side elevation of the apparatus illustrated in Fig. 2;

Fig. 4 shows an enlarged end elevation of the machine looking toward the right, as viewed in Fig. 1, with certain parts of the structure removed;

Fig. 5 shows a detail sectional view, taken on the line 5—5 of Fig. 4;

Fig. 5$^a$ is a detailed sectional view of the label feeding controlling member.

Figure 1:
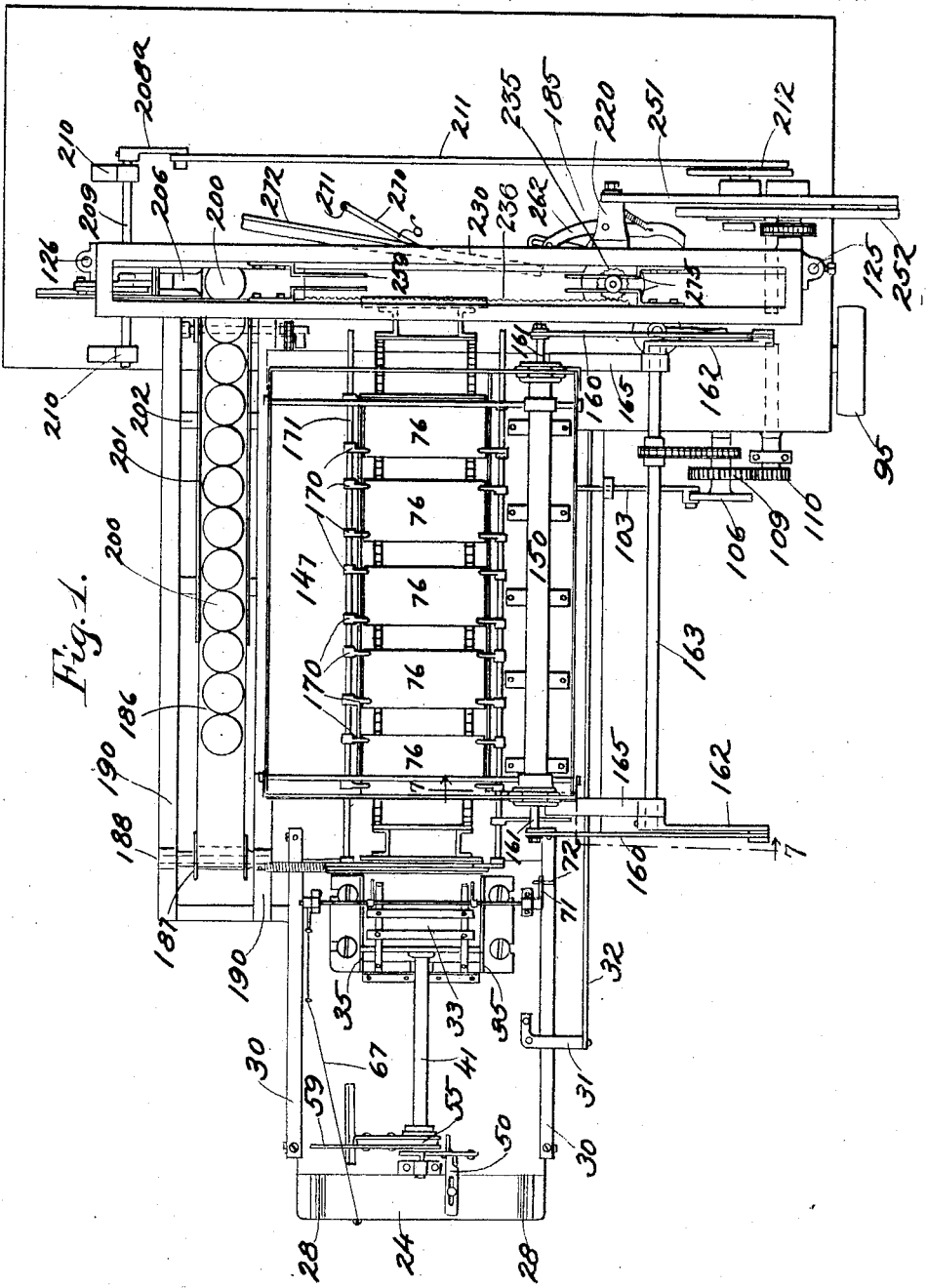
Figure 1 shows a top plan view of my improved machine.
Figure 6:
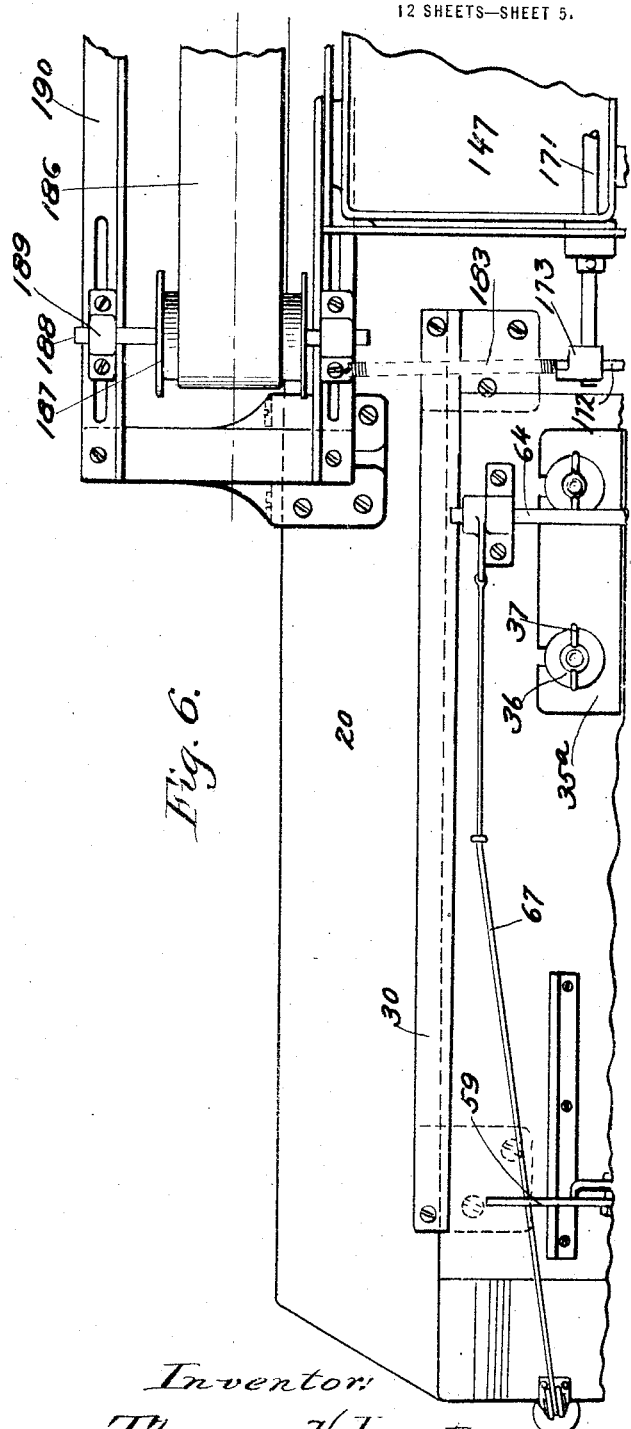

Fig. 6 is an enlarged partial plan view, showing the apparatus illustrated at the top of Fig. 2, together with a part of the can-feeding mechanism;

Fig. 7 is an enlarged broken sectional view, taken on substantially the line 7—7 of Fig. 1, looking in the direction of the arrows, showing the driving mechanism and the label pasting device in elevation;

Fig. 8 is an enlarged top plan view of a portion of the machine showing the end of the can-feeding mechanism opposite that illustrated in Fig. 6, together with a portion of the label carrier;

Fig. 9 is an end elevation of the apparatus illustrated in Fig. 8;

Fig. 10 is an enlarged top plan view of the right hand end of the machine, as viewed in Fig. 1, showing the reciprocating can carrier and a portion of the label carrier;

Fig. 11 is an enlarged end elevation of the machine showing the structure illustrated in Fig. 10;

Fig. 12 is a side elevation of the right hand end of the machine as viewed in Fig.

1, showing that portion of the apparatus illustrated in Figs. 10 and 11;

Fig. 13 is an enlarged top plan view of the apparatus illustrated in Figs. 10, 11, and 12, with parts thereof broken away; and Fig. 14 is a detail sectional view, showing the means for automatically releasing the cans from the can carrier.

This invention comprises a label holder, from which the labels are automatically fed to a label-carrier having a step by step movement and comprising a plurality of pads, each adapted to hold a single label. The labels are automatically secured to the pads, and are automatically pasted by a series of brushes during their movement, so that each label is thoroughly saturated with paste when it arrives at the labeling position, where it is brought into engagement with a can. Each can is given a combined motion of translation and rotation while in contact with a label by means of a can carrier which receives the can from a feeding device, moves it across the label, and then automatically discharges the labeled can. With this preliminary explanation the succeeding description of the operation of the machine will be thoroughly understood.

Referring particularly to Figs. 1, 2, 3, 4, 5, and 6 of the accompanying drawings, it will be seen that the machine is carried by a supporting base 20, such as a table or concrete floor, and the machine comprises a label holder frame 21 having side frame members 22 secured to the base by bolts 23, or the like, and having one or more transverse frame members 24 extending therebetween. The member 24 has the form shown particularly in Fig. 4, and the members 22 serve as supports for a movable table 25, by which the labels are carried and from which they are fed to the label carrier. The table has downwardly extending lugs 26 adapted to pass on opposite sides of the member 24, and carrying rollers 27 which are adapted to run upon the tracks 28 carried by the side frame members 22. The table is also supported and guided in its travel by means of the lateral flanges 29, which seat in suitable grooves formed along the top edges of the member 22, where they are held in place by the plates 30. An arm 31 is attached to the table and extends downwardly over one of the side frame members 22, where they are held in place by the plates 30. The arm 31 is attached to the table and extends outwardly over one of the side frame members 22, where it is pivotally connected to a connecting rod 32 actuated by suitable means to give the table a reciprocating motion. The labels to be used in the machine are inserted in the form of a pack or pad and seated in an inclosure 33 formed by a plate 34 which is mounted transversely of the table and secured thereto, and by two other plates 35 which form the lateral walls for the inclosure, and which have horizontal flanges 35$^a$ seated on the table and secured thereto by means of washers 36, wing nuts 37, and studs 38. These flanges are provided with slots 35$^b$ engaging the studs, so that the walls 35 of the inclosure may be adjusted laterally on the table to accommodate labels of different length, it being understood that the labels lie parallel to the plate 34. A rack 39 rests upon the upper surface of the pack of labels to hold them within the inclosure, and the labels are fed forwardly between the walls 35 by means of a plate or piston 40 mounted on a hollow piston rod 41. At the extreme forward limit of travel of the table the foremost label in the pack is brought into contact with one of the pads of the label carrier, and as the labels are consumed the supply thereof is automatically pushed forward between the walls 35, by means of a feed screw 42 mounted within the hollow piston 41 and having the end thereof journaled in a bearing 43 fixed on the table. This feed screw carries a ratchet 44, which is held against rotation in one direction by means of a pawl 45 pivoted on the arm 46 carried above the bearing member 43. The ratchet is rotated by means of a spring-actuated dog 47 pivoted on a lever 48, which, in turn, is pivoted on the feed screw 42, and which is normally actuated in a downward direction by means of a coil spring 49 connected to the table 25. The upward movement of the lever 48 against the action of the spring is effected in the extreme rearward position of the table by means of an arm 50, which is secured to the transverse frame member 24 by means of adjusting screws 51 passing through the slot 52 in the arm. The arm extends upwardly and forwardly over the rear end of the table, and has an upper inclined surface 50$^a$ adapted to coact with the under side of the lever 48 and to move the same upwardly when the table approaches the rear end of its path of travel, thereby rotating the ratchet 44 and advancing the piston 41 forwardly on the feed screw 42.

In order to permit the automatic feed of the labels within the label holder to be discontinued when desired, I have provided a clutching device 55 by which the feed screw is connected to the piston rod 41. This clutching device comprises an arm 56 which is fixed to the piston rod by means of a collar 57, and this arm is connected by means of the bolts 58 to an operating member 59 having a handle 60 and slots 59$^a$ to receive the bolts. The member 59 has secured thereto an internally threaded member 61, which has a screw-threaded engagement with the feed screw 42 when the member 59 is pushed inwardly. The arm 61 has an aperture 61ª which is larger than the feed screw 42, as shown more clearly in Fig. 5, said aperture being threaded only on one side of its inner surface as clearly shown in Fig. 5ª, so that when the member 59 is pulled outwardly the feed screw will be permitted to rotate freely within the piston rod without advancing the latter. By means of this mechanism the movement of the pad of labels between the walls 35 may be regulated as desired. The foremost labels in the pack within the chamber 33 are normally held against movement away from the piston 40 by means of the arms 63, fixed on the rod 64, journaled in bearings 65 carried by the table. These arms have curved extremities 63ª adapted to extend over the upper edge of the foremost label and contact with the printed face thereof when the arms are moved downwardly, and the arms are normally held in this lower position by means of a crank arm 66 connected to a flexible member 67 passing through an eyelet 68 on the table 25, and thence over a pulley 69 carried on the transverse frame member 64. The other end of the flexible member is connected to a weight 70, which serves normally to maintain the arm 63 in engagement with the foremost label. When the table reaches the forward limit of its travel, the arms 63 are moved upwardly by means of a crank or dog 71, which rides over a horizontally extending lug 72, carried by the bracket 73 mounted on the table 25. When the table again recedes from its forward position the weight 70 will operate to return the arms 71 and 73 to their normal positions.

When the table reaches the forward limit of its travel, the foremost label of the pack, which is then released by the arms 63, is brought into contact with one of the pads or plates of the label carrier 75. This label carrier comprises a series of flat plates 76, each mounted on a substantially U-shaped bracket 77 carried by two parallel endless sprocket chains 78. These sprocket chains are mounted adjacent the forward end of the machine upon sprocket wheels 79 fixed on a shaft journaled in suitable bearings carried by frame members 81, which are secured to the base 20 adjacent the forward ends of the frame members 22. The other ends of the sprocket chains 78 are extended around other sprocket wheels 82 fixed on a shaft 83 journaled in suitable bearings carried by other frame members 81ª, similar to the members 80, and secured to the base adjacent the rear end of the machine. The shaft 83 is driven through a gear 84, which is slidably and non-rotatably mounted on the end thereof, and which is adapted to mesh with an idler gear 85 journaled on a suitable stub shaft 86 carried by the frame member 87, and secured to the base substantially in alinement with frame members 81ª adjacent the rear end of the machine. The idler gear 85 in turn meshes with a gear 88 fixed on another shaft 89 carried by the frame member 87, and this gear is driven by a pinion 90 fixed on the main driving shaft 91, journaled in bearings 92 carried by the frame member 87, and by the other frame members 93 and 94, which are secured to the base 20. The shaft 91 carries a pulley wheel 95, through which the machine is driven by a belt, or the like, extending to a suitable source of power.

In order to give the label carrier 75 an intermittent or step by step movement, the gear 84, mounted on the shaft 83, is intermittently passed into engagement with the idler gear 85. For this purpose the gear 84 is slidably and non-rotatably mounted on the enlarged extension 83ª of the shaft, and is engaged at one end by the coiled spring 97, which bears against the fixed collar 98 and tends normally to move the gear 84 out of engagement with the gear 85. The gear 84 is provided with an annular flange 84ª which limits the movement of the gear into meshing position, and this movement is accomplished by means of an arm 99, pivoted at the point 100 on a suitable part of the frame and pivoted at its lower end to a horizontal lever 101, which, in turn, is pivoted at an intermediate point in the member 102 attached to the base 20. The opposite end of the horizontal lever 101 is pivoted to a rod 103, which is slidably mounted in a member 104, and which carries at its opposite end a roller 105 adapted to bear on the periphery of the cam 106. This cam is fixed on a shaft 107, which is journaled in bearing members 108 carried by the base 20. The cam 106 consists of two parts having different radii. When the roller 105 is riding on the portion of larger diameter, the rod 103 will be pushed to the left, as viewed in Fig. 7, thus oscillating the lever 101 and causing the arm 99 to push the gear 84 into mesh with the gear 85. When the roller passes off the part of larger radius, the spring 97 will push the gear 84 out of mesh with the gear 85, and thus cause the label carrier to come to rest. The shaft 107 is driven through a gear 109 fixed thereon by means of a pinion 110, which meshes with the gear and which is fixed on a shaft 111 journaled in the frame members 108. This shaft carries at its opposite end a bevel gear 112, which meshes with another bevel gear 113 fixed on a shaft 114, journaled in a bearing 115 and carrying a fixed gear 116, which meshes with a driving pinion 117 fixed on the main driving shaft 91.

The apparatus just described is adapted to control the operation of the label carrier, so that it will be brought to rest intermittently with one of the plates or pads 76 located in a vertical plane in alinement with the pack of labels in chamber 33. In order to insure instantaneous stopping of the label carrier when the gears 85 are thrown out of mesh and at the instant that one of the plates 76 arrives at the proper position, there is provided on the shaft 83 a cam or wheel 120 having a plurality of notches or depressions 121, the walls of which are inclined and adapted to be engaged by the pointed extremity 122 of the lever 123, which is pivoted at 124 on the adjacent frame member 81ª, and which is actuated by a coil spring 125, connected to the lever and to the member 81ª, to cause the pointed extremity 122 to drop into one of the depressions 121 when the latter is brought into registry therewith. The number of depressions in the cam 120 corresponds to the number of plates 76 on the label carrier, and the depressions are so located that the part 122 will engage a depression at the instant when one of the plates passes into position to receive a label from the label holder and feeding device, which occurs at the time that the gear 84 is automatically passed out of engagement with the gear 85. At the instant when the gears are engaged, or just prior thereto, the lever 123 is actuated to move the part 122 out of the depression engaged thereby by means of the cam 127, which engages the lower end of the lever and which is fixed on a shaft 128 extending transversely of the machine beneath the shaft 83, and journaled in suitable frame members 129 mounted on the base 20. This shaft is driven by a gear 130, which meshes with the gear 90, mounted on the shaft 91 previously described.

The plates 76 are spaced outwardly from the sprocket chains 78 by means of the brackets 77, and each plate of the label carrier is spotted with paste on the outer surface thereof before it reaches the label-receiving position by means of a lever 140 carrying at its end a porous member 141 saturated with paste, and pivoted at the other end in suitable bearing members 142 attached to the base. This lever is actuated by an arm 143 connected thereto and extending upwardly into the path of movement of a pin 144 projecting from the connecting rod 32, by which a reciprocating movement is imparted to the table 25. The connecting rod is actuated by means of the gear 88 mounted on the shaft 89 previously described. As the table is moved forwardly toward the label-discharging position, the connecting rod will actuate the spotting mechanism and cause the member 141 to moisten the surface of one of the plates 76 with paste at one point adjacent the upper edge thereof, so that during the next succeeding operation of the table this plate will engage and hold the foremost label of the pack by reason of the paste thereon. In this way one label is automatically detached from the pack of labels with each operation of the table.

After receiving a label from the label holder, each plate 76 passes upwardly, and thence travels in a horizontal path above the chains 78, the arrangement being such that the plate which has just received a label will reach a horizontal position before the next plate of the series passes into label-receiving position. The labels carried by the plates 76 are saturated with paste while the latter are in horizontal positions, as just described, and the pasting of the labels is effected by means of a plurality of brushes 146, which receive the paste from two long and relatively shallow vessels or tanks 147 mounted on each side of the label carrier with the upper edges thereof in substantially the same plane as the upper surfaces of the plates 76. These tanks are carried by an upper frame 148, comprising upright members 148ª and horizontal members 148ᵇ, which are preferably of angle bar form, and which are carried by the frame members 81 and 81ª previously described. The upper parts 148ª are connected by transverse members 148ᶜ. The brushes 146 are all carried by a single brush carrier which comprises a plate 150 secured at its opposite ends to small trucks 151 having rollers 152 adapted to run on the tracks 153, carried by the frame 148 and extending transversely to the path of travel of the label carrier. The member 150 is slidably mounted on vertical rods 154, carried by sleeves 155, which, in turn, are adapted to slide upon the horizontal rods 156 extending between the side frame members of the upper frame 148. The member 150 is provided with a plurality of plates 157 secured thereto and in alinement with the respective brushes 146, and each plate carries a U-shaped rod 158, connected to the ends thereof and extending through a part of the adjacent brush 146 which is pivotally suspended from the member 150. Coil springs 159 are mounted on the rods 158 on opposite sides of the brushes, and serve normally to maintain the brushes in vertical positions but permit swaying thereof when the brush carrier is moved transversely of the machine to bring the brushes into engagement with the labels carried by the plates 76. This movement is imparted to the brush carrier by means of connecting rods 160, which are pivoted on the rods 161 secured to and extending outwardly from the opposite ends of the member 150. The connecting rods are pivotally connected at their opposite ends to crank arms 162, fixed on a shaft 163 journaled in suitable bearings 164 carried by the frame members 165 which extend laterally from the frame 148. The shaft 163 has fixed thereon a sprocket wheel 166, which is driven through a sprocket chain 167 mounted on another sprocket wheel 168 fixed on the shaft 107 previously described. As the shaft 163 rotates the brush carrier will be moved transversely of the machine on the tracks 153, which tracks are depressed at their opposite ends and are provided with inclined portions 153ª, by means of which the brush carrier is elevated as it passes from a position over either of the vessels 147, so that when the label carrier is traveling on the intermediate parts of the track members 153 it will be supported in a position wherein the brushes will slide over the surfaces of the labels on the plates 76. After passing over a label in one direction, each brush enters the vessel 147 at the opposite side, receives a new supply of paste, and then makes a return stroke in contact with the same label before the next movement of the label carrier takes place. The label carrier then moves through one step and each label is thereafter subjected to two strokes of the next brush of the series. In this way each label is subjected to the action of a plurality of brushes during its travel from one end of the label carrier to the other, and is thus thoroughly saturated with paste when it reaches a position at the opposite end of the label carrier, where it assumes a position in a vertical plane to be engaged by one of the cans which are to be labeled.

The labels are held firmly on the plates while being treated by the brushes by means of a plurality of small levers or fingers 170, which are fixed on small shafts 171 located adjacent the inner edges of the vessels 147 and journaled in suitable bearings carried by the frame 148. Each of the shafts 171 carries two of the fingers 170 for each of the plates, so that each label is held in position by one of the members 170 at each corner thereof, these members being provided with curved extremities 170ª adapted to extend over the ends of the plates when the shafts 171 are actuated. These shafts are connected by means of a connecting rod 172, pivotally attached at its ends to crank arms 173, fixed on the shafts, so that movement imparted to one shaft is transmitted to the other. The fingers 170 are normally held in firm engagement with the labels by means of a coil spring 181 connected to the frame 148 and to a crank arm 182 fixed on one of the shafts 171, and also by another spring 183 connected to the crank arm 173 of the other shaft 171, and to a part of the lower framework. When the brush carrier moves to the right, as viewed in Fig. 4. the fingers 170 are disengaged from the labels on the plates 76 by the operation of an arm or crank 174, which is fixed on one of the shafts 171 and extends upwardly therefrom through a guide plate 175 carried by a bar 176. This bar may be a continuation of a frame member 165, previously described, and it is mounted parallel to the frame member 148ᶜ, the lower edge of which has a contour similar to that of the adjacent track 153. As the trucks 151 pass downwardly over the inclined portions 153ª at the right hand side of the label carrier, as viewed in Fig. 4, the projecting rod 161 at one end of the brush carrier engages the crank arm 174, and moves the same to the right, thereby disengaging the fingers 170 from the labels and holding them disengaged during the time that the label carrier is being actuated. A complete forward and reverse movement of the brush carrier is effected during each revolution of the cam 106, so that each label is twice treated by the same brush during each period of rest of the label carrier.

Each plate of the label carrier is held in stationary position while in a vertical plane, as shown at 76ª, for a limited period as it passes around the sprocket wheels carried by the shaft 83 at the rear end of the machine, and while in this position the label carried by the plate is detached therefrom and applied to a can. The cans are brought into contact with labels on the plate 76 by means of a can carrier, designated generally by the numeral 185, which receives the cans from suitable feeding mechanism, comprising a feeding belt 186 lying parallel to the path of travel of the label carrier. The forward end of the feed belt extends around a roller 187, which is fixed on a shaft 188 journaled in suitable bearings 189 carried by the side frame members 190, which are supported at the forward end of the machine by a frame member 191 attached to the base 20, and at the other end of the machine by two frame members 192, also attached to the base. At the rear end of the machine the belt is extended around a driving pulley 193, which is fixed on a shaft 194 journaled in the members 192. This shaft has fixed thereon a sprocket wheel 195, which is driven through a sprocket chain 196 from a driving gear 197 fixed on the shaft 128, previously referred to. This shaft is driven continuously from the main driving shaft 91, and thus operates to impart a continuous movement to the feed belt 186. The cans may be placed on the belt 186 manually, or by suitable automatic feeding mechanism, not shown, and they are prevented from sliding off the belt by means of guide plates 201 carried by the members 202 attached to the frame members 190.

At the rear end of the feed belt the cans are discharged into a chute 203. This chute is carried on a table 204 mounted on the supporting members 205, and it has slidably mounted therein a plunger 206, which is automatically actuated to engage the cans, as they are successively discharged into the chute, and push them outwardly into the can carrier 185. The plunger or pusher 206 is pivotally connected to a link 207, which is in turn pivotally connected to one end of the lever 208. This lever is mounted on a shaft 209 carried by a supporting member 210 fixed on the base 20, and another lever 208ª, fixed on the shaft 209, is attached to a connecting rod 211 extending across the rear end of the machine and connected at its other end to a crank disk 212, fixed on a shaft 213, journaled in bearings 214. This shaft has fixed thereon a gear 215, which meshes with the driving pinion 216, fixed on a shaft 217, journaled in bearings 218 and mounted in alinement with the shaft 111. A bevel gear 219 is fixed on the shaft 217 and meshes with the bevel gear 113 carried by the shaft 114.

The can carrier 185 comprises a frame 220 having upper and lower bearings 221 mounted on the guide rods 222 and 223, respectively. These guide rods carry brackets 224 at their extremities, which are adjustably mounted on vertical posts 225 and 226, to which they are secured by set screws 227. The upper guide rod carries a frame spaced upwardly therefrom, which is formed by two parallel angle bars 230 spaced apart and extending from one side of the machine to the other. Another angle bar 231 is mounted directly beneath the forward one of the frame members 230. This frame member of the can carrier is provided with a vertically extending sleeve 232 adjacent the lower guide rod 223, which forms a bearing for the spindle 233 mounted therein and retained against vertical displacement by the collars 234. A gear 235, fixed on the lower end of the spindle, meshes with a rack bar 236 mounted on the frame member 231, so that as the can carrier is moved along the guide rods a rotary movement is imparted to the spindle. The spindle carries at its upper end a can-holding plate 238, having a plurality of flexible tongues 239 secured to the bottom thereof, and carrying upwardly projecting teeth 240, which pass through holes in the plate and are adapted to engage the edges of a can seated thereon. An upper can-holding plate 241 is carried at the lower end of the upper spindle 242, journaled in a sleeve 243, carried by the frame 220, near the upper guide rod. The upper spindle is permitted to slide vertically in its bearing, but is normally moved in a downward direction by means of the coil spring 224 mounted between the sleeve and the can-holding plate. The downward movement of the spindle 242 is limited by a collar 245, adapted to engage the upper end of the sleeve.

The frame 220 carries a pin 249, which engages a slot 250 in the end of a connecting rod 251, which extends therefrom to a crank disk 252 fixed on a shaft 253 journaled in bearings 254 carried by the upper guide rod 222. A sprocket gear 255 is fixed on the shaft 253, and is connected by a chain 256 with a sprocket gear 257 fixed on the shaft 217. A reciprocating movement is thus imparted to the can carrier, and a small period of rest is permitted at each end of the travel thereof by means of the slot 250 in the rod 251. When the can carrier reaches the extreme or forward end of its travel at the right hand end of the guide rods, as viewed in Fig. 9, the plunger will just be reaching the forward limit of its travel, and will push one of the cans out of the chute 203 and between the upper and lower plates 241 and 238 of the can carrier. These plates will be separated to an abnormal distance at this instant by the action of two tongues or bars 259, which are attached to the frame members 230 and inclined in a downward direction, so that they pass beneath and engage the under inclined surfaces of a collar 260 which is fixed upon the upper end of the spindle 242. The upper plate 241 is thus elevated to receive the can between the upper and lower plates. As the can is pushed from the chute into the can carrier, it is guided by two rods 261 attached to opposite sides of the chute 203 by set screws 261ª. The ends of the rods are reversely bent and directed inwardly, and the length of the projecting parts thereof may be regulated by means of the set screws. The spring tongues 239 will permit the can to enter, since the inclination of the surfaces of the teeth 240 will permit the can to slide thereover, and the can will then be firmly held between the plates of the can carrier, and will be carried thereby during the return movement. As the can carrier passes the plate 76ª, which holds the saturated label, the can will be pressed against the label, and will wind up the saturated label on the can, since a rotary movement is imparted to the can by the gear 235 of the rack bar 236.

In order to secure a firm pressure of the can on the label, and to prevent it from being pushed through the plates of the can carrier by the plunger 206, there is provided an arm or lever 262, carried by a vertical shaft 263, which is journaled in the frame 220 of the can carrier. A pair of crank arms 264 are secured to the shaft 263, and carry at their inner ends a rubber roller 265 adapted to bear against the can held by the can carrier. The lower arm 264 is pivotally connected to a slotted link 266, the slot of which is engaged by a rod 267 fixed on the lever 262 and extending downwardly therefrom. The opposite end of this lever is connected by a coil spring 268 to the frame member 220 and another coil spring 269 extends from the frame member to the lower crank arm 264. The latter spring tends normally to maintain the crank arm in contact with a can carried by the plates 238—241, and the spring 268 serves normally to maintain the curved end 262ª of the lever in an inoperative position, as shown in Figs. 12 and 13. This extremity of the lever is provided with a curved recess, which is adapted to engage the can and limit the movement thereof when the lever has been swung into an operative position. This movement of the lever is accomplished adjacent the forward limit of movement of the can carrier by means of the rod 267, which engages and rides upon an angularly disposed guide plate 270, pivoted at 271 on the base 20, and adapted to seat at its other end against an angle bar 272, which is also attached to the base and inclined with respect to the path of travel of the can carrier, as shown in Fig. 1. As the can carrier moves forward in its travel the rod 267 will first ride up on the plate 270, and thus swing the lever 262 around to a position where the curved extremity thereof will lie between the plates 238 and 241 in a position to limit the movement of the can which is discharged into the can carrier by the plunger 206. At the same time the link 266, connected to the lever 262, will move the roller 265 out of operative position, so that it will clear the outer guide rod 261 and not interfere with the free movement of the can. The can carrier may have a slight forward movement after the can has been received thereby, and during its further travel, or immediately after the can has been received by the can carrier, the rod 267 will pass over the end of the plate 270, adjacent the pivot 271, and will be moved back into engagement with the inclined plate 272 by the action of the coil spring 268, thus permitting the roller to engage the guide rod 261 during the return movement. The roller 265 will finally move back into engagement with the can after passing over the guide rod, and will bear on the can with increased pressure after the rod 267 leaves the inclined bar 272. The gear 235 then passes into engagement with the rack 236, so that a rotary motion is imparted to the can while the roller 265 presses the can firmly against the plate 76ª by which the saturated label is carried. As the can carrier reaches the end of its return movement the collar 260, carried at the upper end of the spindle 242, will ride up over two other vertically inclined guide rods or plates 275, carried by the angle bars 230, thus releasing the upper plate 241 from the can. At substantially the same time one of the flexible tongues 239, carried by the lower plate 238, will coact with the under inclined arcuate surface 276 of the can-receiving table 277, so that the can-holding tooth 240 on the side of the plate adjacent the table will be moved downwardly out of engagement with the can. The whirling motion will tend to project the can from the plate onto the table, and the discharge of the can is further expedited by the action of an arm 278, fixed on a suitable shaft 279 mounted in a bearing 280 carried by the can-receiving table 277, which table is in turn mounted on the frame members 93 and 94 in alinement with the lower plate 238 of the can carrier. The lower end of this shaft is also journaled in bearings 281 and 282 carried by one of the frame members 93 and base 20, respectively, and at its intermediate point it has fixed thereon a bevel gear 283, which meshes with a bevel gear 284 fixed on the shaft 115, which is connected in the manner described to the main driving shaft 91. The arm 278 is so located on the shaft 279 that the can will be engaged thereby while one of the spring tongues 239 is depressed by the inclined surface 276, and thus the can will be projected from the plate 238 onto the table 277, from which it may be manually removed by the operator, or by suitable receiving mechanism, not shown. A wall 285, formed preferably of bars of resilient metal, guides the cans as they slide onto the table.

The operation of the invention will be clearly understood from the foregoing description, and a detailed explanation of the operation of the different parts need not be repeated. It will be observed, however, that the labeling operation is carried on in a continuous process by means of the machine, the cans being engaged automatically by the can carrier, and moved across the label carrier in contact with the saturated labels. It will be understood that the driving mechanism is so designed that the label carrier will be actuated to present a new label in label-discharging position during the interval while a labeled can is being discharged from the carrier and the can carrier is returning to the chute 203 to receive a new can. During the time that the label carrier is stationary, however, and a can is being passed into engagement with the saturated label, the pasting mechanism operates to apply paste to a series of new labels, and the feeding mechanism operates to bring a fresh label into contact with the plate at the opposite end of the label carrier. Several necessary operations are thus performed simultaneously, and the various parts of the mechanism are automatically operated at the proper intervals of time to permit a speedy operation of the machine, so that a large number of cans can be labeled during a given period of time as compared with other machines in use for this purpose.

Although I have shown and described a particular embodiment of the invention for purposes of illustration, it will be understood that it may be constructed in various different forms without departing from the scope of the invention as defined in the appended claims.

I claim:—

1. In combination, a plurality of separate label holders, means for moving said holders successively into label-receiving position, means for feeding labels to said holders while in said position, and means for revolving a can in upright position over a label and its holder while the latter is maintained stationary.

2. In combination, a label carrier comprising a plurality of separate label holders, means for actuating said label carrier to bring said holders successively into label-receiving position, means for feeding labels to said holders while in said position, means for applying paste to each of said label holders prior to the movement thereof into label-receiving position, whereby each label will be attached to a label holder, and an automatically operable brush movable transversely of said label carrier for applying paste to the reverse side of said labels while supported on said holders.

3. In combination, a label carrier comprising a plurality of separate label holders, means for actuating said label carrier to bring said holders successively into label-receiving position, means for applying paste to each of said label holders prior to the movement thereof into label-receiving position whereby a label will be attached to each label holder, means operating thereafter for applying paste to the reverse side of said labels while supported on said holders, auxiliary holding means for holding said labels on said label holders, and means for applying paste to said labels while carried by said rollers.

4. In combination, means for holding a plurality of labels, a label carrier comprising a plurality of label plates, means for intermittently actuating said label carrier and moving said plates successively into label-receiving position, means acting in alternation with said last-named means for intermittently feeding said labels from said label holder to said plates, and means movable transversely of said label carrier for applying paste to said labels while supported on said plates.

5. In combination, means for holding a plurality of labels, a label carrier comprising a plurality of label plates, means for intermittently actuating said label carrier and moving said plates successively into label-receiving position, means acting in alternation with said last-named means for intermittently feeding said labels from said label holder to said plates, and means acting in alternation with said first-named means and movable transversely of said label carrier for applying paste to said labels while supported on said plates.

6. In combination, means for holding a plurality of labels, a label carrier comprising a plurality of label plates, means for intermittently actuating said label carrier and moving said plates successively into label-receiving position, means acting in alternation with said last-named means for intermittently feeding said labels from said label holder to said plates, auxiliary holding means acting in alternation with said first-named means for holding said labels on said plates, and means acting in alternation with said first-named means for applying paste to said labels while supported on said plates.

7. In combination, means for holding a plurality of labels, a label carrier comprising a plurality of label plates, means for intermittently actuating said label carrier and moving said plates successively into label-receiving position, means acting in alternation with said last-named means for intermittently feeding said labels from said label holder to said plates, means for applying paste to said labels while supported on said plates and means acting in alternation with said first-named means for imparting a combined motion of rotation and translation to a can while in contact with one of said pasted labels.

8. In combination, means for holding a plurality of labels, a label carrier comprising a plurality of label plates, means for intermittently actuating said label carrier and moving said plates successively into label-receiving position, means acting in alternation with said last-named means for intermittently feeding said labels from said label holder to said plates, a plurality of brushes adapted to engage simultaneously a plurality of said labels while supported on said plates, and means for actuating said brushes in alternation with the operation of said first-named means.

9. In combination, means for holding a plurality of labels, a label carrier comprising a plurality of label plates, means for intermittently actuating said label carrier and moving said plates successively into label-receiving position, means acting in alternation with said last-named means for intermittently feeding said labels from said label holder to said plates, a vessel for containing paste mounted at one side of the path of travel of said label carrier, a plurality of brushes, and means for automatically dipping said brushes in said vessel while said label carrier is in motion and moving said brushes across the labels carried by said holders when said label carrier is at rest.

10. In combination, a label carrier comprising a plurality of label holders, means for intermittently actuating said label carrier, a pair of paste-containing vessels mounted on opposite sides of the path of travel of said label carrier, a plurality of brushes spaced apart distances equal to the distance between successive label holders, a holder for said brushes, and means for automatically dipping said brushes in said vessels and alternately moving the same across the path of travel of said label carrier while the same is at rest.

11. In combination, a label carrier comprising a plurality of label holders, means for intermittently actuating said label carrier, a pair of paste-containing vessels mounted on opposite sides of the path of travel of said label carrier, a plurality of brushes spaced apart distances equal to the distance between successive label holders, a holder for said brushes, means for automatically dipping said brushes in said vessels and alternately moving the same across the path of travel of said label carrier while the same is at rest, and means for automatically positioning said label holders in line with said brushes.

12. In combination, a label carrier adapted to receive and hold labels, means for intermittently actuating said label carrier, means for holding a plurality of labels, means for intermittently actuating said holding means to move one of said labels into engagement with said label carrier when the latter is at rest, and automatically operable means for holding said labels in said holding means during the period when said labels are not in engagement with said label carrier, and for releasing the same when a label is being applied to said label carrier.

13. In combination, a label carrier adapted to receive and hold labels, means for intermittently actuating said label carrier, means for holding a plurality of labels, means for intermittently actuating said holding means to move one of said labels into engagement with said label carrier when the latter is at rest, means for holding said labels in said holding means during the period when said labels are not in engagement with said label carrier, and means operated by the movement of said holding means for automatically rendering said last-named means inoperative when said label carrier is engaged by said labels.

14. In combination, a label carrier adapted to receive and hold labels, means for intermittently actuating said label carrier, means for holding a plurality of labels, means for intermittently actuating said holding means to move one of said labels into engagement with said label carrier when the latter is at rest, and feeding means actuated by the return movement of said holding means for automatically positioning labels therein.

15. In combination, a label-holding member adapted to carry a pack of labels, means for imparting a reciprocating movement to said member, a label carrier adapted to detach the foremost label from said pack at one limit of travel of said member, means for advancing said pack of labels on said member, means operated by the return movement of said member for operating said advancing means, and means for rendering said last-named means inoperative.

16. In combination, a label-holding member adapted to carry a pack of labels, means for imparting a reciprocating movement to said member, a label carrier adapted to detach the foremost label from said pack at one limit of travel of said member, means for automatically engaging and holding the foremost label of said pack until said label reaches said label carrier, and means operated by the movement of said member for automatically disengaging said last-named means before said foremost label engages said label carrier.

17. In combination, an endless conveyer provided with individual label carriers, means for feeding labels to said carriers, means for actuating said carrier to successively present said labels in labeling position, a can carrier, means for feeding cans to said carrier, and means for actuating said can carrier to roll said cans successively into contact with and over said labels as the same are presented.

18. In combination, a can carrier comprising a pair of horizontal plates spaced apart to receive a can between them, means for intermittently imparting a reciprocating movement to said can carrier, means for inserting a can between said plates at one end of the path of movement thereof, and means for automatically discharging said can at the other end of the path of movement thereof.

19. In combination, a can carrier comprising a pair of horizontal plates spaced apart to receive a can between them, means for intermittently imparting a reciprocating movement to said can carrier, means for automatically separating said plates adjacent one end of the path of travel thereof, means for automatically inserting a can between said plates when separated, and means for imparting a rotary movement to one of said plates after said can has been received thereby.

20. In combination, a slidably mounted carrier frame, a pair of can-holding plates mounted thereon, means for imparting a reciprocating movement to said frame, means for automatically increasing the separation of said plates adjacent one limit of the path of travel thereof, means for inserting a can between said plates when so separated, means for imparting a rotary movement to one of said plates after the receipt of a can thereby, means for holding a label in contact with said can during said rotation, and means for releasing said can from said plates after said label has been applied thereto.

21. In combination, a supporting member, a carrier frame slidably mounted on said supporting member, can holding plates mounted on said frame, means for imparting a reciprocating movement to said carrier frame, means for automatically increasing the separation of said plates adjacent each limit of travel of said carrier frame, means for inserting a can between said plates at one end of the path of travel thereof, and means for discharging said can therefrom adjacent the other limit of travel thereof.

22. In combination, a slidably mounted carrier frame, horizontal plates carried by said frame and spaced apart to receive a can, means for automatically inserting a can between said plates adjacent one limit of travel of said carrier frame, and means opposed to said last-named means for positioning said can between said plates.

23. In combination, a slidably mounted carrier frame, horizontal plates carried by said frame and spaced apart to receive a can, means for automatically inserting a can between said plates adjacent one limit of travel of said carrier frame, means opposed to said last-named means for positioning said can between said plates, means for moving said last-named means out of operative position after said can has been received by said plates, and means for discharging said can from said plates thereafter.

24. In combination, means for holding a label, a can carrier movable across said label-holding means, means connected with said can carrier for imparting a rotary movement to said can while the latter is in contact with said label, and means adapted to bear against said can for maintaining a pressure between said can and label during said movement.

25. In combination, means for holding a label, a can carrier movable across said label-holding means, means connected with said can carrier for imparting a rotary movement to said can while the latter is in contact with said label, means for maintaining a pressure between said can and label during said movement, means for inserting a can in said can carrier prior to the movement thereof into engagement with said label, and means for automatically holding said pressure-maintaining means out of operative position when said can is inserted in said can carrier.

26. In combination, a can carrier comprising parallel plates spaced apart to engage the top and bottom of a can, spring means for normally urging one of said plates toward the other, means for inserting a can between said plates, spring-actuated means for holding and positioning said can between said plates, means for applying a label to said can, means for imparting a rotary motion to one of said plates during said label applying operation, and means coöperating therewith during the continued rotation of said plate to release one of said spring-actuated means and thereby permit of said can being ejected from said plates.

27. In combination, a can carrier comprising parallel plates spaced apart to engage the top and bottom of a can, spring means for normally urging one of said plates toward the other, means for inserting a can between said plates, spring-actuated means for holding and positioning said can between said plates, means for applying a label to said can, means for imparting a rotary motion to one of said plates during said label-applying operation, means operating after said labeling operation for releasing one of said spring actuated holding means, and means operated while said spring-actuated means is released for discharging said can from said plates.

28. In combination, means for holding a plurality of labels, a label carrier comprising a plurality of label plates, means for intermittently actuating said label carrier and moving said plates successively into label receiving position, means acting in alternation with said last-named means for intermittently feeding said labels from said label holder to said plates, a vessel for containing paste, a brush, and means for automatically dipping said brush into said vessel and moving the same successively across the labels carried by the plates of said carrier.

29. In combination, a label holding member adapted to carry a pack of labels, means for imparting a reciprocating movement to said member, and a label carrier adapted to detach the foremost label from said pack at one limit of travel of said member, and positively operated means for holding said labels in said holding member during the period when said labels are not in engagement with said label carrier and for releasing the same when a label is being applied to said label carrier.

30. In combination, a label holding member adapted to carry a pack of labels, means for imparting a reciprocating movement to said member, a label carrier adapted to detach the foremost label from said pack at the limit of travel of said member in one direction, a plunger for advancing said pack of labels on said member, a screw shaft engaging said plunger, a ratchet wheel carried by said screw shaft, a lever pivotally mounted adjacent said ratchet wheel, a pawl carried by said lever and engaging said ratchet wheel, and a stationary guide adapted to lift said lever at each limit of travel of said member in the other direction to thereby operate said pawl and ratchet to feed said plunger forward.

31. In combination, a label holding member adapted to carry a pack of labels, means for imparting a reciprocating movement to said member, a label carrier adapted to detach the foremost label from said pack at the limit of travel of said member in one direction, a plunger for advancing said pack of labels on said member, a screw shaft engaging said plunger, a ratchet wheel carried by said screw shaft, a lever pivotally mounted adjacent said ratchet wheel, a pawl carried by said lever and engaging said ratchet wheel, a stationary guide adapted to lift said lever at each limit of travel of said member in the other direction to thereby operate said pawl and ratchet to feed said plunger forward, and manually controlled means for rendering the operation of said ratchet wheel ineffective.

32. In combination, a label carrier provided with a label holder, means for actuating said carrier to bring said holder into label receiving position, means for feeding a label to said holder while in said position, said carrier being thereafter actuated to move said holder and the label carried thereby into a substantially vertical position, and means for gripping a can and rolling the same over said label in an upright position while said holder is maintained stationary in such vertical position.

33. In combination, a can carrier comprising a pair of horizontal plates spaced apart to receive a can between them, means for intermittently imparting a reciprocating movement to said can carrier, means for inserting a can between said plates at one end of the path of movement thereof, means for automatically releasing said can at the other end of the path of movement thereof, and automatically operable means adapted to push said can forwardly after its release.

34. In combination, a can carrier comprising parallel plates spaced apart to engage the top and bottom of a can, spring clips carried by one of said plates to hold a can in proper position thereon, means for inserting a can between said plates in such wise that the same is engaged by said clips, means for holding a label adjacent said can, means for moving said can carrier relative to said label holding means to bring said can into engagement with the label carried thereby, and means for thereafter releasing one of said clips to permit of said can being ejected from said plates.

35. In combination, a slidably mounted carrier frame, plates carried by said frame and spaced apart to receive a can, a plunger for automatically inserting a can between said plates, and an automatically operable arm opposed to said plunger and adapted to be swung into position between said plates during the insertion of a can therebetween to properly position the same.

36. In combination, a slidably mounted carrier frame, spaced apart plates carried by said frame and adapted to engage the top and bottom of a can, means for automatically inserting a can between said plates adjacent one limit of travel of said carrier frame, and means carried by said frame opposed to said last-named means for positioning said can between said plates.

37. In combination, a slidably mounted carrier frame, spaced apart plates carried by said frame and adapted to engage the top and bottom of a can, means for automatically inserting a can between said plates adjacent one limit of travel of said carrier frame, and an arm carried by said frame and adapted to be swung between said plates upon the movement of said frame into receiving position, said arm being opposed to said inserting means and adapted to position said can between said plates.

38. In combination, a can carrier comprising parallel plates spaced apart to engage the top and bottom of a can, flexible tongues carried by one of said plates on the bottom thereof, upstanding teeth mounted on said tongues and projecting through apertures in said plate, said teeth being designed to receive a can between them and to hold the same against accidental displacement, means for inserting a can between said plates in such wise that the same is engaged by said teeth, means for holding a label adjacent said can, means for moving said can carrier relative to said label holding means to bring said can into contact with the label carried thereby, and means for thereafter depressing one of said tongues to withdraw the tooth mounted thereon out of engagement with said can, whereby the latter may be discharged from between said plates.

39. In combination, a can carrier comprising parallel plates spaced apart to engage the top and bottom of a can, flexible tongues carried by one of said plates on the bottom thereof, upstanding teeth mounted on said tongues and projecting through said apertures in said plate, said teeth being designed to receive a can between them and to hold the same against accidental displacement, means for inserting a can between said plates in such wise that the same is engaged by said teeth, means for holding a label adjacent said can, means for moving said can carrier relative to said label holding means to bring said can into contact with the label carried thereby, a table, means operating after said can has been moved in contact with said label for discharging said can onto said table, the edge of said table coöperating with one of said tongues to withdraw the tooth mounted thereon out of engagement with said can prior to said discharging operation.

40. In combination, means for holding a label, a can carrier movable across said label holding means and comprising parallel plates spaced apart to engage the top and bottom of a can, means for inserting a can between said plates, means for imparting a rotary movement to said carrier while said can is in contact with said label, a pressure member, and means operated after the insertion of said can between said plates for bringing said pressure member to bear against said can to maintain a pressure between said can and said label during said rotary movement.

41. In combination, means for holding a label, a can carrier movable across said label holding means and comprising parallel plates spaced apart to engage the top and bottom of a can, means for inserting a can between said plates, means for imparting a rotary movement to said carrier while said can is in contact with said label, a pressure member, means operated after the insertion of said can between said plates for bringing said pressure member to bear against said can to maintain a pressure between said can and said label during said rotary movement, and means for automatically holding said pressure member out of operative position when said can is inserted in said carrier.

42. In combination, an endless label carrier comprising a plurality of label holders, means for feeding labels to said holders, means for intermittently actuating said carrier, means acting in alternation with said carrier actuating means for applying paste to said labels while supported on said holders, and mechanically operated means mounted independently of said paste applying means and to one side of said carrier for holding said labels on said holders and against displacement during the paste applying operation.

43. In combination, an endless label carrier comprising a plurality of label holders, means for feeding labels to said holders, means for intermittently actuating said carrier, means acting in alternation with said carrier actuating means for applying paste to said labels while supported on said holders, mechanically operated means for holding said labels on said holders and against displacement during said paste applying operation, and means operated by said paste applying means for rendering inoperative said holding means after paste has been applied to said labels.

44. In combination, an endless label carrier comprising label holders, means for feeding labels to said holders, means for intermittently actuating said carrier, a track above said carrier and extending transversely thereof, a paste containing vessel mounted on one side of the path of travel of said carrier, a carriage mounted on said track, a brush depending therefrom and adapted to dip into said vessel when said carriage is moved thereover, and means acting in alternation with said carrier actuating means for moving said brush across one of said holders to apply paste to the label carried thereby.

45. In combination, an endless label carrier comprising label holders, means for feeding labels to said holders, means for intermittently actuating said carrier, a track above said carrier and extending transversely thereof, a paste containing vessel mounted on one side of the path of travel of said carrier, a carriage mounted on said track, a brush depending therefrom and adapted to dip into said vessel when said carriage is moved thereover, means acting in alternation with said carrier actuating means for moving said brush across one of said holders to apply paste to the label carried thereby, mechanical means for holding said label on said holder during the movement of said brush thereover, and means actuated by said carriage adjacent its limit of travel in one direction for rendering said mechanical holding means inoperative.

46. In combination, an endless label carrier comprising label holders. means for feeding labels to said holders, means for intermittently actuating said carrier, a paste applying brush suspended above said carrier, and means acting in alternation with said carrier actuating means for moving said brush successively over the label holders of said carrier to thereby apply paste to the labels supported thereby.

47. In combination, an endless label carrier comprising label holders, means for feeding labels to said holders, means for intermittently actuating said carrier, a paste applying brush suspended above said carrier, means acting in alternation with said carrier actuating means for moving said brush successively over the label holders of said carrier to thereby apply paste to the labels supported thereby, means for holding said labels on said holders during the movement of said brush thereover, and means actuated by said brush adjacent its limit of travel in one direction for rendering said holding means inoperative.

In testimony whereof, I have subscribed my name.

THOMAS H. LESTER.